April 14, 1959     M. BITZER     2,881,959
WINDSHIELD WASHER
Filed Oct. 29, 1956
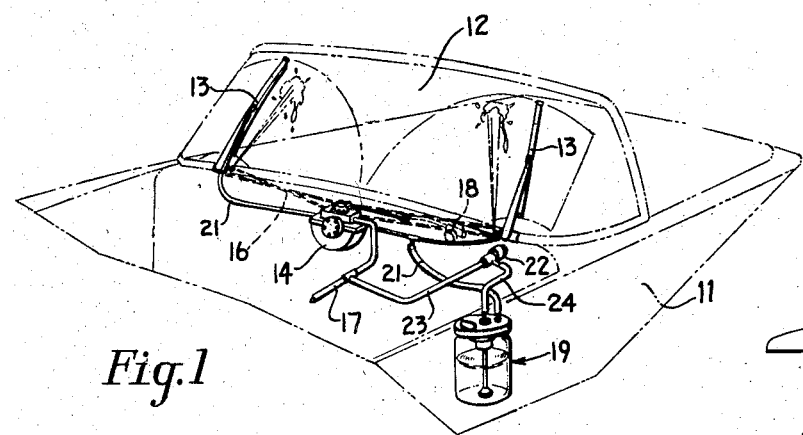
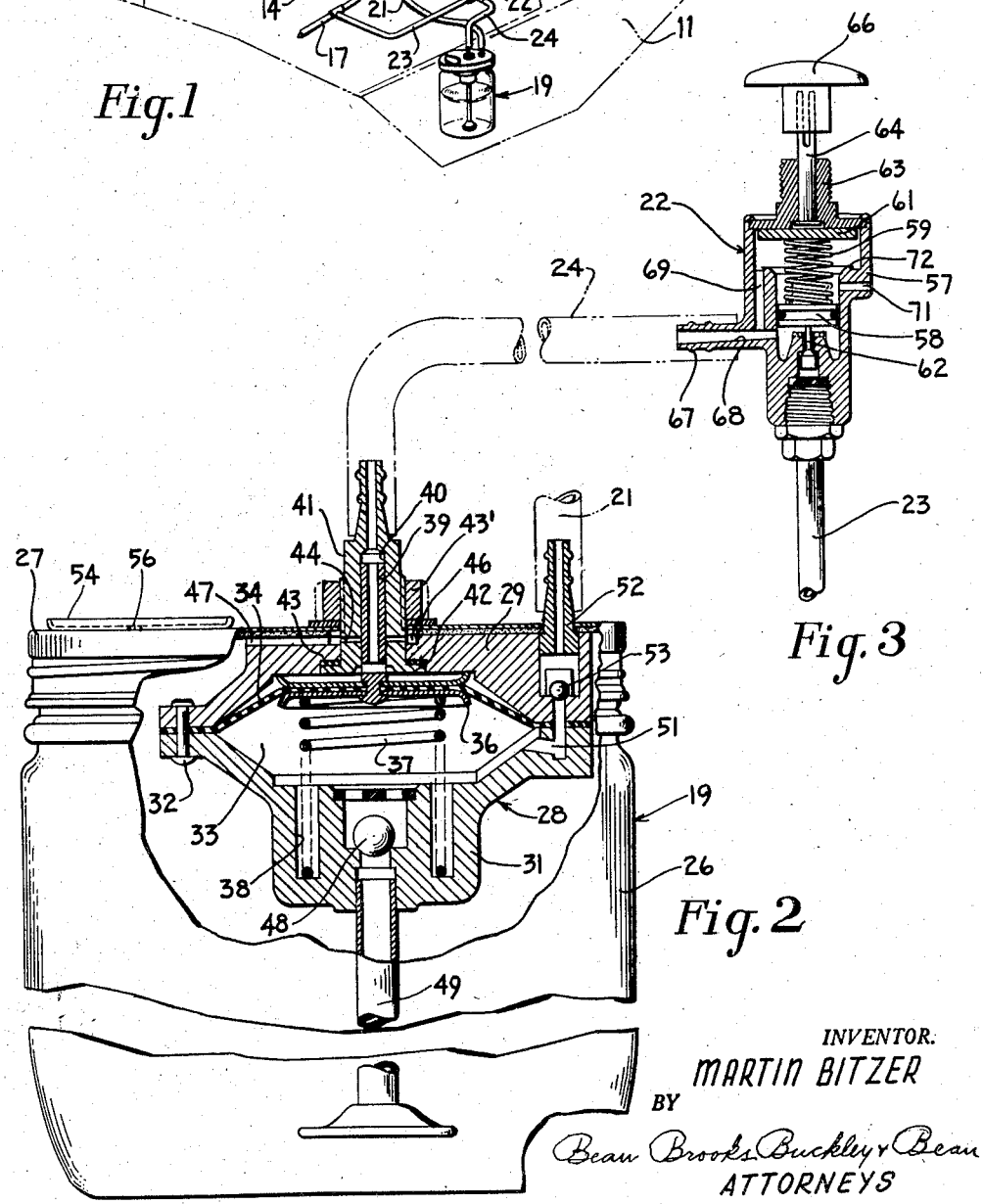
INVENTOR.
*MARTIN BITZER*
BY
*Bean Brooks Buckley & Bean*
ATTORNEYS

United States Patent Office 2,881,959
Patented Apr. 14, 1959

2,881,959

WINDSHIELD WASHER

Martin Bitzer, Kenmore, N.Y., assignor to Trico Products Corporation, Buffalo, N.Y.

Application October 29, 1956, Serial No. 618,893

5 Claims. (Cl. 222—334)

This invention relates to windshield washer systems and more particularly to a pressure operated washer system.

The use of pressure operated accessories in motor vehicles of contemporary design is becoming more commonplace, such accessories including for example, window operators, seat adjustment mechanisms, and windshield wiper motors which employ compressed air, although as far as this invention is concerned, other forms of pressure medium may be employed.

Briefly, the windshield washer system of the present invention comprises a pressure operated pump adapted to deliver a predetermined amount of water from a reservoir to the vehicle windshield for the washing thereof, and control means for regulating the operating cycle of the pump.

The main object of this invention is to provide a windshield washer system with a pressure operated washer reservoir.

A further object of the invention is to provide a windshield washer system, having a pressure operated reservoir, with a control means for regulating the operating cycle of said system.

Another object of the invention is to provide a pressure operated washer reservoir and controls therefor characterized by extreme simplicity of structure, and reliability in use.

These and further objects and features of the invention will become more apparent from the following description and the accompanying drawing wherein:

Fig. 1 is a fragmentary perspective view of a motor vehicle having a windshield washer system embodying the principles of the invention;

Fig. 2 is a sectional view of a pump mechanism used in the washer system illustrated in Fig. 1; and Fig. 3 is a sectional view of a pump control unit used in the system illustrated in Fig. 1.

Referring to the drawing, numeral 11 identifies a motor vehicle having a windshield 12 upon which are arranged a pair of wipers 13 driven by a pressure operated wiper motor 14 connected to the wipers by a flexible transmission means, such as cables 16. The wiper motor, which may be of the type disclosed in copending patent application Serial No. 581,758, filed April 30, 1956, is connected by conduit means 17 to a source of pressure fluid, such as an air-compressor (not shown) driven by the vehicle engine. A control knob 18, located in the vehicle within easy reach of the vehicle operator, is connected to the wiper motor to provide for the operational control thereof.

A washer reservoir assembly 19, positioned in the engine compartment, is arranged to deliver a quantity of liquid to the windshield 12 via hose, or conduit means 21. A washer control assembly 22, located in the vehicle compartment, is connected by a conduit 23 to the source of pressure fluid via conduit 17, and is also connected to the reservoir assembly by means of conduit 24.

The reservoir assembly 19 includes a round tank, or jar 26, and a cap, or cover 27 which is rotatably secured to the tank. A pump assembly 28, affixed to the underside of the cap, includes an upper casing portion 29 and a lower casing portion 31, which portions are secured together by fastening means such as rivets 32. The pump portions 29, 31 are formed to provide a cavity 33 in which is arranged a flexible diaphragm 34 secured about its periphery between the pump portions and arranged to divide the cavity into an air chamber above the top surface of the diaphragm and a water chamber below the lower surface of the diaphragm. A pair of metal discs 36 are arranged one on each side of the diaphragm 34, the lower disc serving as an abutment for one end of a compression spring 37, the other end of the spring seating in a circular groove 38 formed in the lower pump portion 31. A hollow stem member 39 extending upwardly from the diaphragm and slidingly arranged within a bore 40 formed in a nipple element 41, is arranged at its lower end to clamp the discs 36 to the diaphragm. The upper end of the nipple element 41 is adapted to receive the conduit 24, while at the lower end thereof is a flange 42 which seats within a recess 43 formed in the upper pump portion 29. The end of the nipple element projecting above the cap 27 is threaded to receive a nut 43' which may be tightened to removably secure the pump assembly 28 to the cap 27. A plurality of radial passageways 44 are formed in the nipple element 41, said passageways being in alignment with a circular groove 46 which is connected by a horizontal passageway 47 to the interior of the tank. A ball check valve 48, positioned in the lower pump portion 31, allows the one-way flow of liquid from the jar through an intake tube 49 into the water chamber beneath the diaphragm 34. A passageway 51 connects the water chamber with a nipple 52 arranged to receive conduit 21, said passageway 51 having at the end thereof, a ball check valve 53 to allow the one-way flow of liquid from the water chamber into the conduit 21. A cover 54 is arranged upon the cap 27 to allow for replenishing the reservoir water supply, said cover having a vent 56 adapted to maintain atmospheric pressure within the tank 26.

It will be seen that when a pressurized medium, such as compressed air, is in the conduit 24, flow of said pressurized medium will occur into the air chamber above the diaphragm 34 to cause the downward movement of said diaphragm, resulting in the compression of the spring 37, and the displacement of liquid from the water chamber into the nipple 52 and conduit 21. When air pressure is released, the spring 37 will expand, forcing the diaphragm upwardly and allowing water under atmospheric pressure to flow through the intake tube 49, past the unseated check valve 48, and into the water chamber. In such manner, the pump assembly 28 serves to eject a given quantity of water from the tank into the conduit 21.

A washer control assembly 22 comprises a housing 57 in which is slidably arranged a member in the form of a piston 58, a compression spring 59 and a disc 61. The piston 58 abuts the end of a stem valve 62 which, when in seated position, prevents compressed air flow from the conduit 23 into the housing in the region below the piston 58. A housing end portion 63 encloses the upper end of the housing and is arranged to slidably support a stem 64, the lower end of the stem abutting the disc 61, and the opposite end of the stem having a knob 66 affixed thereto. Projecting from the side of the housing is a nipple 67 having a passageway 68 which connects the volume of the housing below the piston 58 with the conduit 24. Extending upwardly from the passageway 68 is passageway 69 adapted to permit compressed air to flow upwardly within the housing and to act upon the top surface of the disc 61, when the control valve is operated. The volume above the piston 58, in the region of the spring 59, is vented to atmosphere via port 71. A circular seat 72 is arranged within the housing for the seating of the disc 61.

Axial pressure upon the knob 66 will cause the downward movement of the disc 61 into seated engagement upon the seat 72, resulting in the compression of the spring 59, and the downward movement of the piston 58. Such movement will cause the unseating of the small valve 62 allowing compressed air to flow into the passageways 68 and 69, resulting in air flow into the pump cavity 33 on top of the diaphragm 34, to thereby displace cleaning liquid from the cavity into the conduit 21, as has been described. Compressed air flow in the passageway 69 will result in development of pressure upon the upper surface of the disc 61 to keep the latter in seated engagement with seat 72. When the stem 39 of the pump assembly 28 uncovers passageways 44, there will be a sudden drop of pressure in the conduit 24 as the compressed air escapes to atmosphere via the circular groove 46, passageway 47, and the vent hole 56 in cover 54. As a result, there will occur a drop in pressure, whereupon the spring 59 will overcome the holding pressure on top of the disc 61 and movement of the disc upwardly to its original position will occur. Decompression of the spring 59 will permit the small valve 62 to move upwardly and be seated due to the pressure of the compressed air in the conduit 23, whereupon compressed air flow into the conduit 24 will be terminated. The spring 37 of the pump assembly 28, will expand and move the diaphragm 34 upwardly in the chamber 33, thus permitting the intake of another charge of cleaning liquid to the chamber 33.

In operating the washer control assembly 22, it is only necessary that the stem 64 be moved axially until the disc 61 engages the seat 72, whereupon axial pressure on the stem 64 may be released following which a complete liquid ejection and recharging of the water pump will take place as described above.

From an understanding of the foregoing it will be apparent that the principles of the invention may be utilized to provide a windshield washer system with a pressure operated washer reservoir having control means which automatically regulates a liquid ejection cycle by the easy manipulation of a control knob, said system being characterized by extreme simplicity of structure and reliability in use.

The foregoing description has been given in detail without thought of limitation since the inventive principles involved are capable of assuming other physical embodiments without departing from the spirit of the invention and the scope of the appended claims.

What is claimed is:

1. A windshield washer system comprising a reservoir assembly including a liquid container, a cover for the container, and a pump assembly secured to the underside of the cover, said pump assembly having a chamber containing a flexible diaphragm defining therewith an air chamber on one side of said diaphragm and a water chamber on the other side thereof, a control assembly connected by a conduit to the air chamber of said pump assembly, said control assembly being connectable to a source of compressed air and having a seat for a valve which may be unseated to allow flow of compressed air through the control assembly to the air chamber of the pump assembly, said control assembly having means responsive to the pressure of compressed air flow through the control assembly to maintain the valve in unseated position, and resilient means adapted to move said pressure responsive means whereby the valve may be seated, said pump assembly having a stem affixed to the diaphragm whereby compressed air in the conduit may be vented to atmosphere after a predetermined movement of the diaphragm to allow the resilient means to move said pressure responsive means so that the valve may move to seated position.

2. In a windshield washer system, a reservoir assembly including a liquid container, a cover for the container, and a pump assembly removably affixed to the underside of the cover, said pump assembly being arranged to provide a cavity in which is disposed a flexible diaphragm defining an air chamber and a water chamber, a compression spring arranged in the water chamber and adapted to urge the diaphragm in the direction of the air chamber, a liquid intake tube connected to the water chamber, a ball check valve arranged to permit one way flow of liquid from the intake tube into the water chamber, means including a passageway for the flow of liquid from the water chamber to a conduit arranged exteriorly of the pump and having a ball check valve for the one way flow of liquid from the water chamber through said passageway, a hollow stem slidably arranged in a nipple element projecting above the top surface of said cover, said nipple element being adapted to receive a conduit for delivery of compressed air to the air chamber, and means providing passageways adapted to be uncovered by said stem as the diaphragm is moved by compressed air in the direction of the water chamber whereby said compressed air will be vented to atmosphere.

3. In a windshield washer system, a container for washing fluid, a pump assembly operatively connected to said container, said pump assembly having a cavity containing a flexible diaphragm dividing said cavity into a pressure fluid chamber and a washing fluid chamber, spring means normally urging said diaphragm into said pressure fluid chamber, means providing a washing fluid intake passage communicating with said washer fluid chamber and extending interiorly of said container, means providing a washing fluid discharge passage communicating with said washing fluid chamber and extending exteriorly of said container, valve means providing one-way flow of washing fluid through said intake and discharge passages, whereby spring urged movement of said diaphragm into said pressure fluid chamber will draw a charge of washing fluid through said intake passage and into said washing fluid chamber, and whereby movement of said diaphragm into said washing fluid chamber will expel such a charge of washing fluid therefrom through said discharge passage, a stem member connected to said diaphragm for movement thereby, means providing a pressure fluid inlet passage extending into said pump assembly and through said stem member into communication with said pressure fluid chamber, conduit means connected to said pressure fluid inlet passage and adapted for connection to a source of fluid under superatmospheric pressure, control valve means operatively connected to said conduit means to control the admission of fluid under superatmospheric pressure into said pressure fluid chamber for moving said diaphragm into said washing fluid chamber, and means providing a pressure fluid vent passage communicating with said pressure fluid inlet passage, said stem member normally blocking said vent passage to preclude the escape of pressure fluid therethrough and moving out of blocking position relative thereto to vent said pressure fluid chamber upon predetermined washing fluid displacing movement of said diaphragm.

4. In a windshield washer system, a reservoir assembly including a container, a pump assembly mounted in said container, said pump assembly comprising a casing having a flexible diaphragm dividing said casing into a liquid chamber and an air chamber, said diaphragm being responsive to compressed air admitted to said air chamber to eject a quantity of liquid from said liquid chamber into an outlet conduit connected to said liquid chamber, said diaphragm having means associated therewith to vent such compressed air to atmosphere after said diaphragm has displaced a predetermined quantity of liquid, and means biasing said diaphragm to an inoperative position, and a control assembly for controlling movement of said diaphragm toward said liquid chamber, said control assembly being connected to said air chamber by a conduit and being connectible to a source of compressed air and including a valve movable from a valve seat to allow flow of compressed air through said control assembly to said pump assembly, a member in said control assembly movable for the unseating of said valve, a disc arranged in said control assembly and movable by means of an axially slidable stem to cause a seating of said disc, and a compression spring arranged between said disc and said member, said disc being arranged to be maintained in seated position due to the pressure of compressed air flowing through said control assembly, said compression spring being adapted to unseat said disc when the air pressure drops a predetermined degree whereupon said member will move away from said valve to allow the seating of said valve whereby compressed air flow through said control assembly is restricted.

5. In a windshield washer system, in combination, a container for holding a supply of windshield washer fluid, a pump assembly mounted in said container, said pump assembly comprising a casing having a flexible diaphragm dividing said casing into a washer fluid chamber and an air chamber, said diaphragm being responsive to compressed air admitted to said air chamber to eject a quantity of washer fluid from said washer fluid chamber into an outlet conduit connected to said washer fluid chamber, said pump assembly having means operable automatically to relieve the pressure of compressed air from said diaphragm upon predetermined washer fluid displacing movement thereof, means biasing said diaphragm to an inoperative position and thereby charging said pump assembly with a given supply of washer fluid after relief of air pressure upon said diaphragm, and a control assembly connected to said air chamber by means including an inlet conduit and adapted to regulate the flow of compressed air to said pump assembly for controlling movement of said diaphragm toward said washer fluid chamber, said control assembly being connectible to a source of compressed air and operable to initiate flow of compressed air to said pump assembly, and said control assembly having means automatically operable to continue such air flow until the air pressure in said inlet conduit decreases to a predetermined value.

References Cited in the file of this patent
UNITED STATES PATENTS

| | | |
|---|---|---|
| 1,258,033 | Martin | Mar. 5, 1918 |
| 1,627,257 | Stevens | May 3, 1927 |
| 2,294,236 | Levernier | Aug. 25, 1942 |
| 2,688,514 | Oishei et al. | Sept. 7, 1954 |
| 2,746,652 | Oishei | May 2, 1956 |